United States Patent [19]

Hadni et al.

[11] 3,930,240

[45] Dec. 30, 1975

[54] FERROELECTRIC MEMORIES AND METHOD OF ACTIVATING THE SAME

[75] Inventors: Armand Hadni, Nancy; Robert Thomas, Saint Die, both of France

[73] Assignee: Agence Nationale de Valorisation de la Recherche (ANVAR), Neuilly-sur-Seine, France

[22] Filed: Mar. 25, 1974

[21] Appl. No.: 454,616

Related U.S. Application Data

[63] Continuation-in-part of Ser. No. 273,531, July 20, 1972, Pat. No. 3,820,088.

[30] Foreign Application Priority Data

July 23, 1971 France .............. 71.27044
Dec. 17, 1973 France .............. 73.44966

[52] U.S. Cl. .............. 340/173.2; 340/173 LS
[51] Int. Cl.² .............. G11C 11/22; G11C 11/42
[58] Field of Search .... 340/173.2, 173 LS, 173 LT; 350/160 R

[56] References Cited
UNITED STATES PATENTS

| | | | |
|---|---|---|---|
| 3,229,261 | 1/1966 | Fatuzzo et al. | 340/173.2 |
| 3,701,121 | 10/1972 | Fraser | 340/173.2 |
| 3,710,352 | 1/1973 | Smith et al. | 340/173.2 |
| 3,820,088 | 6/1974 | Hadni et al. | 340/173.2 |
| 3,835,459 | 9/1974 | Luke et al. | 340/173.2 |

OTHER PUBLICATIONS

Ferro–Electric Ceramic Stores High Resolution Images, Optics and Laser Technology, Vol. 4, No. 2, 4/72, pp. 91 & 92.

*Primary Examiner*—Stuart N. Hecker
*Attorney, Agent, or Firm*—William D. Stokes

[57] ABSTRACT

The invention relates to high-capacity memory devices permitting non-destructive reading. The memory comprises a plate made of ferroelectric material with a very thin metallized film thereon to absorb the radiation from a laser beam, and a thicker metallized film. The source allows the orientation of all the ferroelectric domains. A second source, in combination with laser scanning, permits writing into the memory device. Reading is effected by scanning with the laser and detecting the direction of current flow through a resistor 20. The device is useful in computers.

14 Claims, 15 Drawing Figures

FERROELECTRIC MEMORIES AND METHOD OF ACTIVATING THE SAME

The present invention relates to memories, that is to physical systems for storing information, to a method of activating such memories, and to improvements in or to a ferroelectric memory comprising a thin plate formed of a ferroelectric material and metallized directly on its two large faces.

The present invention is a continuation-in-part of our prior application Ser. No. 273,531 now U.S. Pat. No. 3,820,088 filed July 20, 1972.

It is well-known that computers, telephone exchanges and other data or information processing systems are dependent on the one or more memories used. The performance characteristics of such systems depend on the capacity, speed and reliability of their memories.

Current high-speed memories of the magnetic core of integrated circuit type have the disadvantage of being relatively expensive when it is required to store a large amount of data, as is often the case. For instance, a ferrite core memory costs approximately 1 cent per binary unit of information, or bit.

It has already been proposed to utilize ferroelectric memories in a manner corresponding to the use of ferromagnetic materials, but hitherto such ferroelectric memories have had two drawbacks, namely that of having only relatively small capacity and that of involving destructive reading (the bit read being erased in the reading process). Moreover their cost per bit is high, this being inherent in their design.

Figure 1:
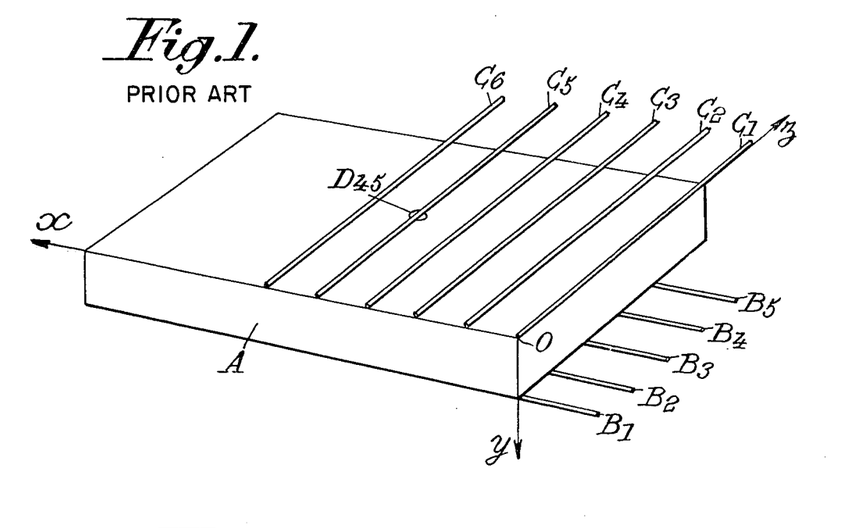
FIG. 1, already described, shows the state of the art.

FIG. 1 in the accompanying drawings is an isometric perspective showing a known type of ferroelectric memory. This memory consists basically of a plate A made of a ferroelectric material, following a generally rectangular shape along mutually perpendicular axes oxyz and cut at right angles to its ferroelectric axis oy, and two systems of parallel conductors, of which one (the system of conductors $B_1, B_2, B_3 \ldots$) is parallel to the axis ox and the other (the system of conductors $C_1, C_2, C_3 \ldots$) is parallel to the axis oz, these two systems being applied to the bottom and top surfaces respectively of the plate A. There was thereby determined on the plate A a matrix of prisms (also known as domains) of axis oy, such as the prism $D_{45}$ between conductor $B_4$ and conductor $C_5$.

If a voltage of given value is applied across conductors $B_4$ and $C_5$, the conductor $B_4$ being at a positive potential, the prism $D_{45}$ will be subjected to an electric field acting in the direction $\vec{oy}$ and will therefore be polarized in the direction $\vec{oy}$, which by definition corresponds to writing a 1 in the matrix memory with n.m positions, where $n$ is the number of conductors B and $m$ the number of conductors C. Contrariwise, prisms initially polarized along $\vec{yo}$ represent a "O".

In such a memory, reading was done by creating in the prism $D_{45}$ an electric field of opposite sense to the writing sense by applying a voltage of opposite polarity across the conductors $B_4$ and $C_5$ and then detecting the current produced by the reversal in the polarization of this prism when a 1 was written. But since in ferroelectricity there is unfortunately no real coercive force as in ferromagnetism, the application of a weak field in the reverse sense $(\vec{yo})$, if applied for a long time or in repeated pulses, sometimes caused a definitive switching of the ferroelectric domain of that particular prism and the consequent erasure of the 1 written. The reading process — if repeated at any rate — was consequently destructive. In short, a memory device of this type was volatile, which is of course a serious drawback.

It has recently been discovered that certain ferroelectric materials like glycine sulfate experience only a partial and momentary switching provided that the reverse electric field is applied for a period of time not exceeding a critical value called $t^*$ (G. W. Taylor — Utilization of the $t^*$ Partial Switching Properties of Ferroelectrics in Memory Devices — IEEE Trans. on Electronic Computers, Vol. EC-14, No. 6 (1965) 881). Consequently, individual readings of such a ferroelectric material are made by applying the reverse reading field for a time lapse less than $t^*$. Several readings can be made without erasure. However, this technique requires not only highly sensitive and very-short-response reading means (to permit detection of the reading signal during the very short reading, less than $t^*$), but above all the existence of systems of B and C conductors, resulting in a limitation of the number of bits which can be written on a given surface and at high cost (since it is necessary to be able to apply the voltages selectively across a given conductor B and a given conductor C). For this reason, ferroelectric memories, and even those which apply the $t^*$ principle, have not come into wide use.

It is an object of the present invention to overcome the above-mentioned disadvantages by providing a simple ferroelectric memory offering high bit density per square centimeter (being devoid of the two perpendicular arrays of conductors), non-destructive reading, and high sensitivity without, in principle, applying a voltage liable to switch the polarization of the different prisms.

It is a further object of the invention to provide a memory which is fast and reliable.

Another object is to provide a memory device which can also be used for displaying and storing images.

According to the invention there is provided a ferroelectric memory characterised in that it comprises, in combination, a thin plate made of a ferroelectric material cut at right angles to its ferroelectric axis and metallized over its two large faces perpendicular thereto, means for applying across said two faces, when required, a first or a second voltage of different values and opposite sense, a load resistor connectable across the two metallized faces of the plate, means for focusing the spot of a laser beam of desired intensity on to one of the two metallized faces of the plate (hereinafter referred to as the active face) and for scanning said active face of the plate with said spot, the laser beam being utilized both for writing and reading information on said memory, and means for detecting the flow and direction of a current through said resistor when the same is connected across said two faces.

Preferably, the second voltage, which is directed in the opposite direction to that of the first voltage, has a value slightly less than a value corresponding to the coercive force for which the polarizations of the elemental plate domains would be switched, the intensity of the laser beam concentrated on one of the domains allowing of reducing the coercive force, during application of said second voltage, until the polarization of the illuminated domain is switched.

The method of utilizing the ferroelectric memory according to the invention for writing and reading information thereon in the form of binary digits 0 or 1, comprises the steps of:

applying the first voltage of higher value across the metallized faces whereby to polarize all the ferroelectric domains of the plate in the same sense, writing one of the two binary digits by applying, on the one hand, the second voltage of opposite sense to the first voltage across the metallized faces and, on the other hand, the spot of the laser beam upon that memory cell of the active face on which said binary digit is to be written, thereby switching the ferroelectric domain beneath said spot from its previous sense of polarisation to the opposite sense of polarization, and reading the memory by applying the laser beam to the memory cell to be read and by connecting said resistor across the two metallized faces whereby to cause a current to flow through said resistor, the direction of this current, which is a function of the sense of polarization of the ferroelectric domain beneath the cell, indicating in binary digit written on said cell, and reading being effected through the agency of the means for detecting the flow and direction of a current.

The binary digit 1 may be assigned for example to the memory cells or points which have received the laser spot and the polarization sense of which associated ferroelectric domain has accordingly been switched. Hence the digit 0 will correspond to those domains which have retained their initial sense of polarization, that is to say to the cells or points which have not received the laser spot.

Indeed, the inventors were surprised to note that if there is simultaneously applied to a plate of triglycine sulfate (the two faces at right angles to the ferroelectric axis of which are each coated with a metallization film, one of the films being thin enough to absorb the radiation, and the ferroelectric domains of which are polarized in the same direction and the same sense):

an intense illumination localised on the plate face covered with the thin absorbent film, and a voltage of appropriate value and sense across the two metallization films, then the polarization sense of that domain will be switched. If it is postulated by definition that the laser beam is actually applied, i.e., not occluded, when it is required to write a 1, then it may be said that the switching of a domain corresponds to writing a 1. Conversely, occluding the laser beam in the course of its scan will cause a "0" to be written and in such cases the domain will not be switched even if said voltage exists (since the intense illumination and application of the voltage are needed simultaneously to switch a domain).

Moreover, the inventors have noted that if, after the desired ones or zeros have been written on the different cells of the plate, each of these cells or points is illuminated in succession at the same time as a resistor (rated at approximately 1000 ohms, for example) is connected across the two metallization films, then the resistor will be traversed by an electric current the direction of which depends on the sense of the polarization of the domain illuminated at that instant by the laser spot. Thus it becomes extremely easy to read each memory cell by means of a device which detects the flow and direction of the current through said resistor.

The inventors have furthermore observed that the memory functions under optimum conditions for both writing and reading when the laser beam is modulated.

In a ferroelectric memory of the type which has been outlined above, the thin plate is cut perpendicularly to the ferroelectric axis and said memory comprises: means for applying a preparation or erasing voltage between the two metallised faces, a load resistor connectable between the two said faces, means for concentrating the spot of a laser beam of desired intensity directly on one of the two faces constituting an active face of the plate and to scan point by point, with this spot, this active face, said spot of a laser beam being used both for writing and reading of information on the active face of the plate, the means for detecting the flow and direction of a current in said load resistor when it is connected between the two metallized faces.

For writing information in a domain of a plate of the abovesaid type, it was necessary to apply, between the two metallized faces, a second voltage which has, on one hand, a sense opposite the erasing voltage and, on the other hand, a suitably selected value.

The domains referred to above extend in a direction perpendicular to the faces of the plate and after the application of the erasing voltage the polarization of these domains has a well-determined direction. The simultaneous application of said spot of the laser beam at a point of the active face of the plate and of the second voltage between the two metallized faces causes the irreversible switching of the polarization in the domain occurring under said point. This switching is sometimes called "commutation". "The information" written in a domain corresponds to the sense of polarization in this domain.

In the course of experiments carried out within the scope of the invention, the inventors have observed, surprisingly, that such a second voltage was not absolutely indispensible to effect the reversal of polarization in each domain. They have in fact noted that it was possible to obtain such switching with the application alone of the spot of the laser beam. They observed, in addition, that even with a voltage of the same sense as the erasing or preparation voltage, it was possible to obtain such irreverisble switching of polarization.

It is therefore a further object of the invention to enable the production of a ferroelectric memory which is simpler than that described above.

It is a further object to provide such a memory which enables the writing of information on a plate with a density of information per surface unit which is substantially greater than the density of information obtained with other previously known flat memories.

Another object of the invention is to provide a memory of the type concerned on which information can be written at a substantially higher speed than with previously known ferroelectric memories.

The ferroelectric memory according to the invention comprises accordingly a thin plate formed of a ferroelectric material, preferably cut perpendicularly to its ferroelectric axis, and metallized directly on its two large faces, means for applying an erasing voltage between these two faces, means for concentrating the spot of a laser beam directly on one of the two metallized faces of the plate and to scan said face point by point with this spot, and means for reading information written on said memory and it is characterised by the fact that it comprises means for applying, on writing, a voltage of zero value or of the same sense as the erasing voltage, the energy applied by this spot of the laser beam on each point of the active face of said plate being at least equal to a given value. Advantageously said laser beam has a given intensity and the time of application of the laser spot is at least equal to a time $t^+$ which is a function of said intensity.

In the preferred application of the invention there is provided, for reading, a load resistor connectable between the two metallized faces of the plate and the abovesaid laser beam is used both for reading and for inscription of information on the active face of the plate. In this case, the reading means are arranged so that the energy introduced by the reading spot of the laser beam at each point is substantially less than the energy introduced, on writing, at each point by the writing laser beam. In a preferred embodiment of the invention, in which the same laser is used for writing and reading operations, the time of application of the laser beam spot at each point of the active face of the plate is much less in the case of reading than in the case of writing. In a modification, the intensity of the reading laser beam is substantially less than the intensity of the writing laser beam.

Other objects, characteristics and advantages of the invention will appear more clearly on reading the following description of various embodiments of the invention, this description being given with reference to the accompanying drawings and purely by way of non-limiting example, in which drawings.

Figure 2:
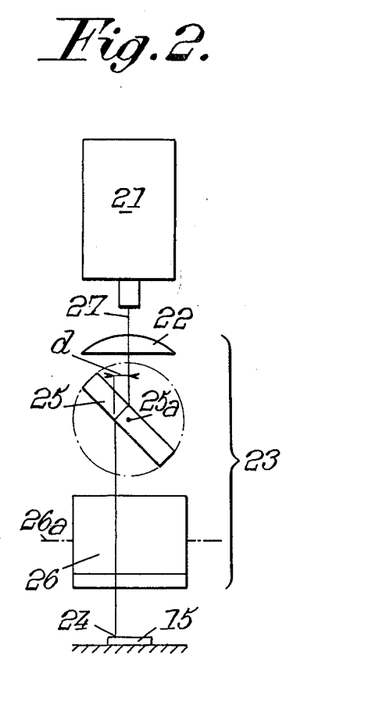
FIGS. 2 and 3, each of which is considered with reference to FIG. 4 drawn on an enlarged scale, illustrate two embodiments of a memory according to the invention.
Figure 3:
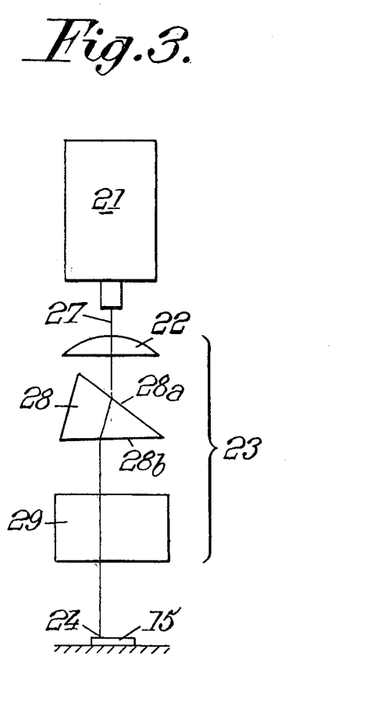
Figure 4:
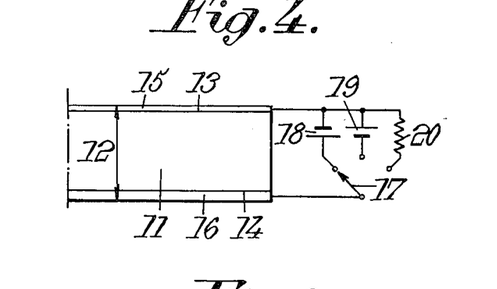

Referring first to FIGS. 2 to 4, the memory device is shown as comprising a thin plate 11 made of a ferroelectric material such as triglycine sulfate, some other ferroelectric crystal, a ferroelectric ceramic, or a ferroelectric plastic film. Plate 11 is cut at right angles to its ferroelectric axis 12 and is metallized over its upper and lower larger faces 13 and 14 perpendicular to axis 12. In the particular example considered herein, the thickness of the plate is approximately 20 to 50 microns, the upper metallization film 15 is a few thousand Angstroms thick, and the lower metallized film 16 is a few microns thick. The metallizing may be obtained with gold, for instance, in which case the upper film will have a square resistance of approximately 400 ohms.

A selector switch 17 allows connecting as required, across the metallized films 15 and 16, a first voltage source 18 utilized for preparing the plate 11 for subsequent writings, a second voltage source 19 for permitting writings on plate 11, and a resistor 20 for reading the data written on the plate.

The memory device further includes, both for writing and reading, a laser 21 such as a helium-neon gas laser operating in the region of the red, a condenser 22, and means 23 for scanning, with the spot 24 focused by condenser 22, the entire surface of the metallized film 15 of plate 11, as will be explained hereinafter with reference to FIG. 11.

In the two embodiments shown in FIGS. 2 and 3, the means 23 differ.

In the case of FIG. 2, the means 23 comprise two plane slabs 25, 26, rotatable about their mutually perpendicular axes 25a and 26a. Each slab 25 or 26 allows deflecting the laser beam 27 through a distance d proportional to the angle of rotation of the plate. Thus slab 25 permits scanning along individual lines, while the slower rotation of slab 26 permits transition from one scanning line to the next, the entire scanning process taking place roughly as in a television system and ultimately covering the entire useful surface of the plate 11 (see FIG. 11).

In the case of FIG. 2, the scanning is done mechanically, means having to be provided to rotate the slabs 25 and 26. For this reason the scanning cannot be effected very rapidly, and in order therefore to increase the scanning speed an electrically controlled scanning system of the kind shown in FIG. 3 may be provided, in which the scanning means 23 are formed by two fixed prisms 28, 29, the refraction index of each of which is modifiable by applying an electric field across its two faces (28a and 28b in the case of prism 28). Such prism systems utilising the Kerr or Pockels effect are well-known in the electro-optics art.

In the two embodiments shown in FIGS. 2 and 3, the scanning is effected by shifting the laser beam while the plate 11 remains stationary. Manifestly, in an alternative embodiment (not shown) the laser beam could be stationary (the means 23 being dispensed with) and the plate 11 could be moved along the two coordinate axes at right angles to the ferroelectric axis 12 whereby to fetch the different memory cells or points of plate 11 beneath the laser spot 24.

In all cases the scanning is effected intermittently, the laser spot 24 being arrested over each cell.

Lastly, the memory device includes means (not shown) for cutting off the laser beam 27, such means consisting either of means for controlling the excitation of the laser 21 or of means for occluding the laser beam 27, and means (likewise not shown) for detecting the flow and direction of a current through the resistor 20.

The structure of a ferroelectric memory device according to this invention having been thus described, it is now proposed to explain, with reference to FIGS. 5 – 10, the manner of writing and reading bits on said memory device after initial preparation of the plate 11.

Figure 5:
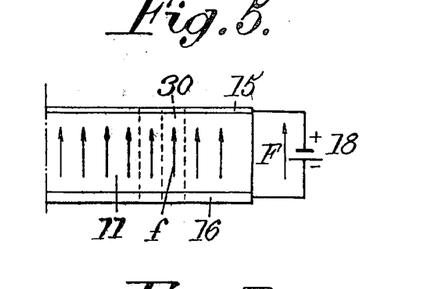
FIGS. 5, 6 and 8 respectively depict the manner of preparation of the memory plate, the writing of a 1 thereon, and the reading thereof.

The first step is to prepare the plate by applying, across the metallized films 15 and 16, that voltage of source 18 which has a value and direction such that it polarizes all the elemental domains on ferroelectric plate 11 in the sense of arrow F (in FIG. 5 the plate 11 is shown as having been prepared with the polarization vector $f$ of each domain 30 aligned in the direction F).

By definition, when the polarization vector $f$ of a domain is oriented in the direction of arrow F it is taken to correspond to a 0. A plate 11 prepared thus accordingly carries only 0 bits on all its writing cells.

The source 18 accordingly has its positive pole connected to film 15 and its negative pole to film 16, the voltage of the source being of the order of 500 volts per tenth of a millimetre of plate thickness. In a preferred alternative embodiment, the plate is prepared using a source of lower potential, in which case the temperature of the plate must be raised by heating or irradiation to approximately 60°C (the coercive force being cancelled above the curie temperature — 50°C in the case of triglycine sulfate — see FIG. 7), after which the plate must be cooled while continuing to maintain the electric polarizing field.

Having been prepared as disclosed above, the plate is then ready for data bits, and more particularly 1 bits, to be written on the desired memory cells.

Figure 6:
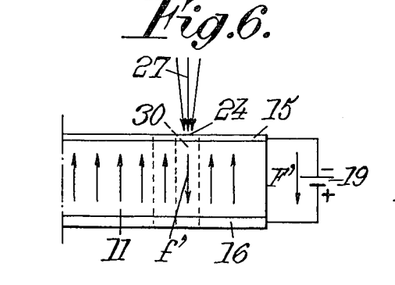

As illustrated in FIG. 6, writing is effected by simultaneously applying:

a voltage across metallized films 15 and 16, said voltage, which is produced by switching in the source 19, being applied in the direction of arrow F' opposite to the direction of arrow F in FIG. 5 and having a value of approximately 50 volts per tenth of a millimetre of thickness of plate 11, and, in order to write a 1, the focused spot 24 of a laser beam 27 on metallized film 15.

This simultaneous application causes the polarization vector of the domain on plate 11 located beneath the spot 24 to switch from the direction F to the direction F', as shown in the case of the polarization vector $f'$. This switch is probably due to the reduction in coercive force caused by the intense illumination.

Figure 7:
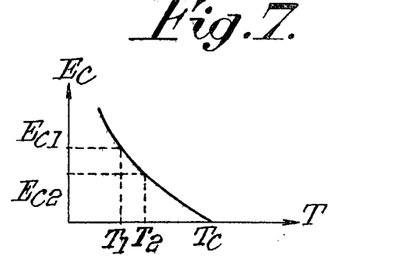
FIGS. 7 and 9 graphically portray the variations of the coercive force $E_C$ and the polarization $P_S$ as a function of the temperature T.

FIG. 7 depicts graphically the pattern of variation of the coercive force $E_C$ with the temperature T, which shows that the coercive force diminishes with rising temperature (ultimately reaching zero for a certain temperature $T_C$ known as the Curie temperature). The illumination by the concentrated laser beam of domain 30 beneath the laser spot 24 causes the temperature of this domain to rise and the coercive force to consequently decrease, thereby permitting easier switching of the domain 30 responsively to the electric field produced by source 19. Thus it will be appreciated that the intensity of the laser radiation, on the one hand, and the magnitude of the voltage on the other hand, must be adjusted so that:

in the absence of laser radiation and hence of a temperature rise in the domain 30, the latter's polarization is not reversed by the electric field produced by the voltage applied by source 19 across metallized films 15 and 16, but that, in the event of illumination, the polarization of domain 30 be switched in response to said electric field.

The temperature rise must therefore be sufficient to produce a substantial variation in the coercive force, for instance from $E_{C_1}$ to $E_{C_2}$ for a temperature rise from $T_1$ to $T_2$ (FIG. 7). However the electric field must be slightly below the value which would produce switching if there were no laser radiation.

Thus, in the specific embodiment considered herein, the intensity of illumination which caused the polarization of the domain to switch, and a 1 to be accordingly written, was of the order of 100 watts/cm², whereas the voltage was 25 volts for a plate 0.05 mm thick. If, on the contrary, it is required to write a 0, the domain on which the 0 is to be written must not be illuminated so that no switching takes place, the intensity of illumination being then 0 watt.

In addition, the inventors have observed that it is preferable to modulate the amplitude of the illumination at a frequency lying, say, between 1 kHz and 1 MHz.

Figure 8:
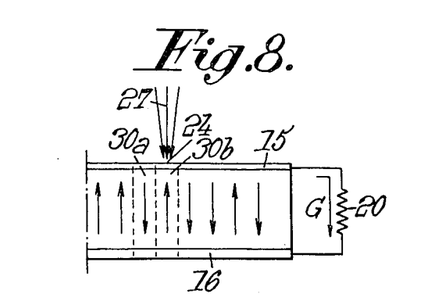
Figure 9:
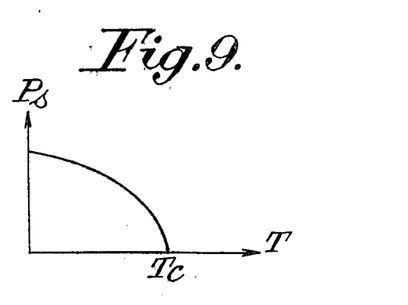

Reference to FIGS. 8 and 9 will now be had in order to explain the process of reading a memory, into the different elemental cells of which zeros and ones have been written. In FIG. 8, for example, the cell corresponding to domain 30a carries a 1, while the cell formed by domain 30b carries a 0.

The reading process consists of connecting resistor 20 across films 15 and 16 and illuminating the domain or cell to be read by means of laser beam 27 and focusing the spot 24 thereof over said domain. If required, a small voltage may be applied across films 15 and 16, but this is by no means essential.

In the event of illumination, the degree of polarization of the illuminated domain (such as 30b) varies as a result of the pyroelectric effect. FIG. 9 shows how the polarization $P_S$ varies as a function of the temperature T, ultimately decreasing to zero at the Curie temperature $T_C$ (which is the same as the temperature in FIG. 7). This temperature $T_C$ is approximately 50°C for triglycine sulfate.

To a degree of polarization $P_S$ there corresponds a density of surface charges over the domain 30b equal to $P_S$. This density of positive charges in film 15 and negative charges in film 16 in the case of the domain 30b, corresponding to the writing of a 0, produces an electric current through the resistor 20, the intensity of which is proportional to the charge density (hence to $P_S$) and to the area of the domain, said current flowing through resistor 20 in the direction shown by arrow G. If, on the contrary, a domain such as 30a on to which a 1 had been written were to be illuminated, then the film 16 would carry positive charges and the film 15 negative charges, thus causing a current to flow through resistor 20 in the opposite direction to arrow G. It will therefore be readily appreciated that, providing the presence and, above all, the direction of the current through resistor 20, or rather through the electric circuit containing it, can be detected by means, say, of a galvanometer of an electronic amplifying device series-connected to resistor 20, it is possible to know whether the domain over which the laser beam is located has had a 1 or else a 0 written on it.

It is to be noted that, in principle, readings are effected without applying an electric field, thereby avoiding changes in the direction of polarization of the domains being read, and this even in the event of repeated readings. Thus the reading process is non-destructive.

The lower the value of the resistor 20, the shorter the response time and therefore the faster the speed at which the domains can be scanned in succession by the laser beam, though in that case the reading signal will be weaker. A good compromise may be adopted by using a resistor of about 1000 ohms.

Figure 10:
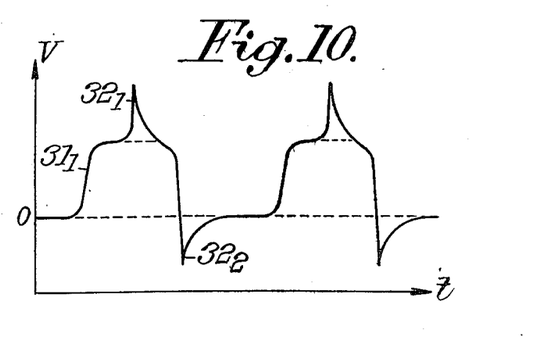
FIG. 10 shows the reading response time with sensitivity-increasing peaks, time $t$ being represented along the X-axis and voltage V along the Y-axis.

The inventors have additionally observed that, at least in the case of triglycine sulfate, the reading signal includes, in addition to the normal pulses $31_1$ corresponding to a 1, peaks $32_1$ and $32_2$ which increase the sensitivity enormously (see FIG. 10). The reason for these peaks has not yet been fully elucidated, but it would appear that the additional signal represented by these peaks corresponds to a reversible switching of the domains responsive to illumination by the laser spot 24.

Under certain conditions, the peaks 32 will allow the strength of the reading signal to be multiplied tenfold when the spot 24 is intense enough. This makes it possible to reduce the value of the resistor 20 for a given reading sensitivity, and to consequently increase the scanning speed during readings, thus resulting in valuable time saving. In fact it has been found possible to achieve reading speeds of a few microseconds per bit.

Figure 11:
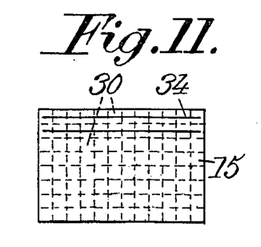
FIG. 11 is a top view of the manner of dividing of the upper face of the plate into elemental domains and the manner of scanning the same in succession.

FIG. 11 depicts the plate 11 with its upper film 15 in plan view in order to clearly represent the disposition of the different domains 30 forming a rectangular matrix of storage points or cells. Each cell is determined by the dimension of the spot 24, which for example may be of the order of 10 microns in diameter(for clarity in FIG. 11, domains of square, not circular, section are shown). In the course of their experiments, the inventors observed that individually switchable elemental domains could have sections of approximately 10 microns in diameter without causing interference between adjacent domains in the same scanning line or in successive lines. This being so, a plate with a useful surface area measuring 50 × 50 mm is capable of storing 5000 × 5000 = 25,000,000 bits with only two electrodes formed by the films 15 and 16, as opposed to the 5000 + 5000 = 10,000 conductors B and C which would be required in the prior art memory matrix shown in FIG. 1.

Considering next the scanning process, this is effected along lines of type 34, the laser spot 24 moving successively over the different cells in a line, after which, upon completion of that line, scanning starts again along the next line, either in the same direction or in the opposite direction.

In the embodiment of the invention which will be described with reference to FIGS. 12 to 15, the plate 111 (FIGS. 12 to 14) is, as described above, formed of triglycine sulfate (TGS). This plate is cut perpendicularly to its ferroelectric axis. In other words, its two large faces (parallel) 113 and 114 are perpendicular to said ferroelectric axis. More precisely, the polarization of the domains hence will extend along the abovesaid direction perpendicular to the two faces 113 and 114.

Figure 13:
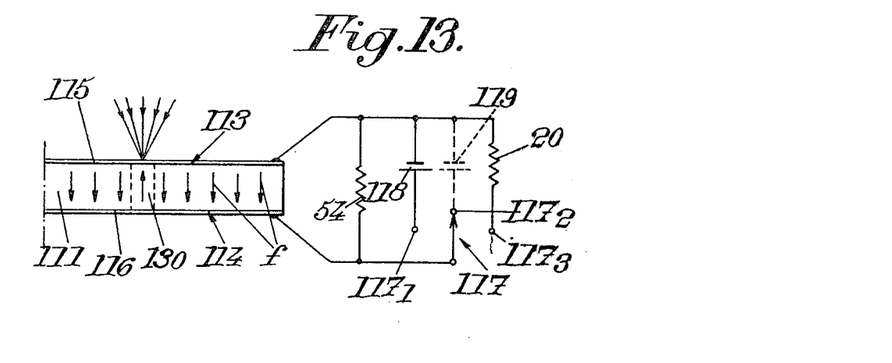
FIG. 13 illustrates, in diagrammatic manner, the writing of information on a memory according to the invention.

Each of the faces 113 and 114 of the plate 111 of TGS is covered directly, over the whole of its surface, with a metallic layer, 115 and 116 respectively. Contacts are formed on each of the layers 115 and 116 for connecting the latter to a circuit which comprises a switch 117, a DC voltage source 118 and a reading resistor 120. The switch 117 has three positions $117_1$, $117_2$ and $117_3$; in the first position $117_1$ (erasure or preparation position) the source 118 applies between the layers 115 and 116, which constitute electrodes, a voltage of such value that all the domains of the ferroelectric plate are polarized in the same sense. In FIG. 13 this sense is shown by that of the arrow f. The third position $117_3$ of the commutator 117 (FIG. 14) enables the connection of the electrodes 115 and 116 through the reading resistor 120.

The role of the second position $117_2$ of the commutator 117 will be explained below with relation to the description of FIG. 13, this second position forming part of the invention.

Figure 12:
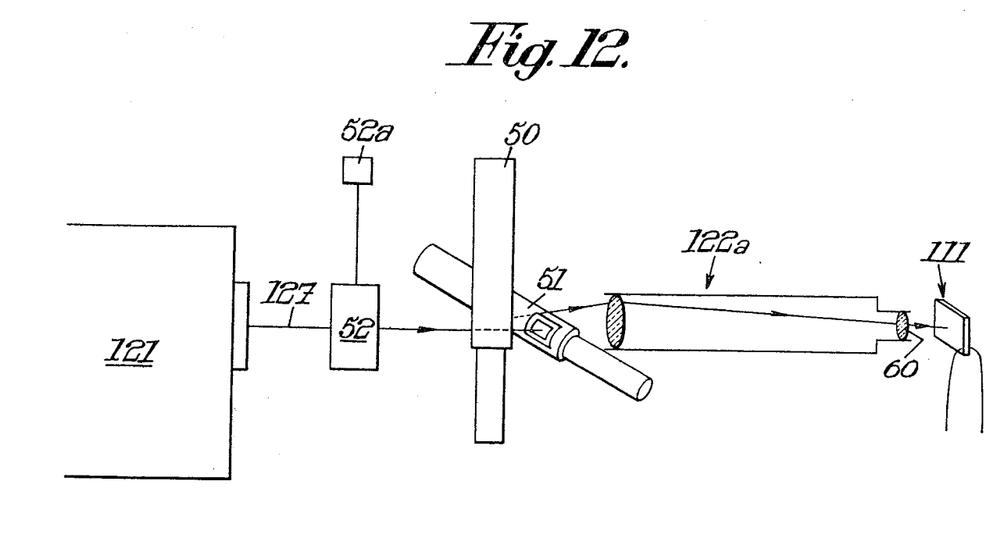
FIG. 12 shows an assembly for writing and reading of information on a memory according to the invention.

Referring now more particularly to FIG. 12, it is seen that the assembly for reading and writing information in the domains of the plate 111 comprises, still as in the principal patent, a laser 121 and means for scanning the beam 127 emitted by this laser over a two-dimensional network of points corresponding to the ferroelectric domain of the plate 111. In the examples shown these scanning means comprise two mirror galvanometers 50 and 51. The galvanometer 50 is for scanning in a direction corresponding to that of the axis of the abscissae and the galvanometer 51 is for scanning in a perpendicular direction, corresponding to that of the axis of ordinates.

Means 122a enable the concentration of the laser beam spot on the active face 113 of the plate 111. In the example a microscope is used enabling extremely reduced dimensions to be conferred on the laser beam spot. This microscope is arranged between the scanning means and the plate so that its objective 60 is directed towards the active face 113. In the embodiment shown, still as described in prior embodiments, the laser 121, the scanning means and the means 122a for concentrating the spot are used both for writing and reading information in the domains of the plate 111.

Figure 14:
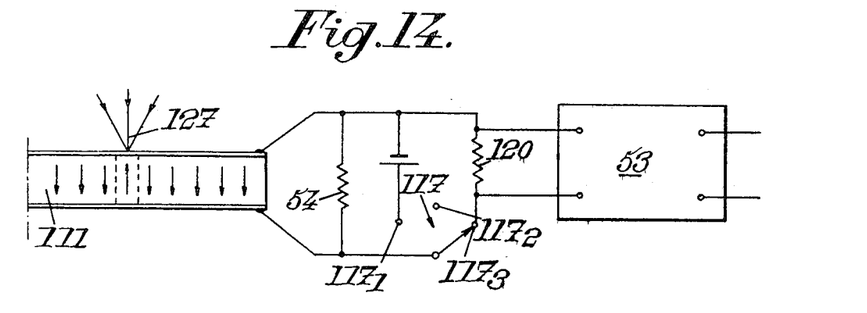
FIG. 14 shows, also in diagrammatic manner, reading of information on a memory according to the invention.

Of course for reading information written on the ferroelectric plate 111, that is to say in order to know the sense of polarization of each domain of said plate 111, the laser beam spot 127 is concentrated on the layer 115 and the switch 117 is placed in its third position $117_3$ (FIG. 14). Thus according to the sense of polarization of the domain below the point illuminated by the laser spot 127, a current will flow in one direction or the other in the resistor 120. The voltage generated by said electric current which flows in the resistor 120 is amplified by means of an amplifier 53 whose input terminals are connected to the two ends of the resistor 120. As known also, polarization of a domain in one sense can represent the binary number 0 and polarization in another sense can represent the binary number 1. For example, for polarizations directed in the direction of the arrow f (FIG. 13) the figure 0 is represented for polarization in the opposite sense the figure 1 is represented.

According to the invention, for writing information in a domain 130 of the plate 111, means are provided for applying a voltage of zero value between the electrodes 115 and 116 or means for applying a voltage of a value different from zero but of the same polarity as the voltage applied by the source 118 on preparation or erasing of the plate 111.

In the embodiment of the invention which is shown in FIGS. 13 and 14, the means for conferring on writing, a voltage of a zero value between the metallic layers 115 and 116 comprise a resistance 54 which is connected permanently to the terminals of said electrodes 115 and 116. Since this resistance 54 is connected permanently it must have a substantially higher value than that of the resistor 120. In the example the resistance 54 has a value of 1 MΩ while the resistor 120 has a value of 1 KΩ. Moreover in the second position $117_2$ of the switch 117 one of the terminals of said switch is in open circuit.

As a modification it is possible to provide a second source 119 which is connected in the same way as the source 118 (in the same sense) and which applies a voltage of given value between the electrodes 115 and 116. It is seen in FIG. 13 that, in the position $117_2$ of the switch 117, the positive pole of the source 119 (shown in interrupted lines) is connected to the electrode 116; similarly the positive pole of the source 118 is connected to the electrode 116 when the switch 117 is in the position $117_1$. It is to be noted that, in this case, the resistance 54 is not indispensable.

In order that the polarization of a domain 130 may be switched in irreversible manner when the top of this domain is illuminated by the laser beam spot, it is necessary that the energy supplied by said spot should have a sufficient value. In the course of experiments carried out within the scope of the invention it has been noted that this energy had to be all the greater as the conditions imposed on the second voltage, as described in previous embodiments, are departed from. More precisely the inventors have observed that the greater the voltage applied between the electrodes 115 and 116 (but of the same sign as the erasure voltage) the more necessary it was that the laser beam spot should introduce high energy to obtain irreversible switching.

In the embodiment described the plate of triglycine sulfate has a thickness of about 10 microns. The metal of the layers 115 and 116 is chromoium which is deposited by evaporation on the layers 113 and 114. The thickness of the chromium layers is some tens of Angstroms; this thickness of chromium corresponds substantially to a squared resistance of 377 ohms = $\sqrt{\mu_0/\xi_0}$, $\mu_0$ being the permeability of the vacuum and $\xi_0$ the dielectric constant of the vacuum. This value of the squared resistance corresponds to absorption, by the layer 115 of 50% of the energy supplied by the laser beam spot. The laser 121 is of the argon type and has a power of 10 mw. With such an assembly, whose transmission coefficient is of the order of 50%, it was noted that it was necessary to apply the laser beam spot to a point of the layer 115, at the top of a domain 130, for a time at least equal to one millisecond to obtain irreverisble switching of the polarization of said domain when the voltage applied has zero value.

In the course of an experiment carried out within the scope of the invention it was also noted that with a lower intensity of the laser beam it was possible also to obtain, under the same conditions, an irreversible switching of polarization in a domain on condition that the time of application of this laser beam be distinctly greater.

Figure 15:
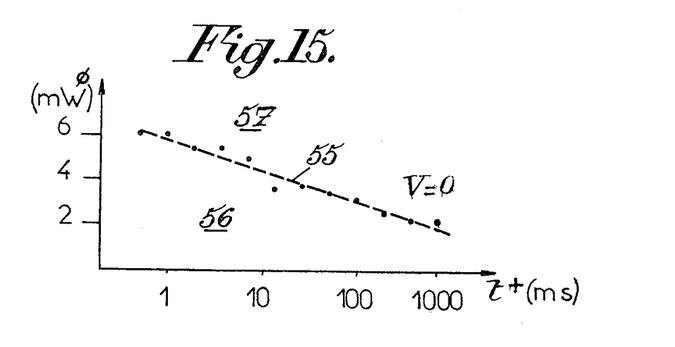
FIG. 15 is a diagram showing the values of the intensity of the laser beam as a function of the time of application of the laser beam for writing information on a memory according to the invention.

FIG. 15 illustrates the results of this experiment. In the diagram of this FIG. 15 there is shown as abscissae, on a logarithmic scale, the minimum time $t^+$ of the application of the laser beam. Intensity $\phi$ of the laser beam is plotted as ordinates (on a linear scale). In FIG. 15 it is seen that the curve of the variations of $\phi$ as a function of $t^+$ is substantially a straight line when the second voltage has a zero value. In other words, the law of variation of $t^+$ as a function of $\phi$ would, to a first approximation, be of exponential type. The experiment illustrated in FIG. 15 corresponds to the case where $\phi$ varies between 2 and 6 mw, $t^+$ varying then from 1,000 ms to 0.5 ms.

The straight line 55, which corresponds to the value V = 0 of the second voltage, divides the space into two regions lower 56 and upper 57. If, for V = 0 on writing, the time of application and the intensity of the laser are selected so that the point representing these values is in the diagram of FIG. 15 in the region 56 there will not be obtained an irreversible switching of polarization in a domain. On the other hand if the values of the intensity and of the time of application of the laser beam spot are in the region 57, or on the line 55, there will be obtained, an irreverisble switching of said polarization of a domain.

To return now to the reading step of the ferroelectric memory (FIG. 14) it is important to note that the energy which must be supplied by the laser beam spot at each point is substantially less on reading than on writing. In fact, if these were not so, that is to say if the energy supplied on reading were of the same order of magnitude as the energy supplied on writing, there would be risk of obtaining an irreversible switching of polarization in the domain on which reading is carried out. There would then be obtained a destructive reading of the information written at each point of the ferroelectric memory, which would be a departure from the desired goal.

To obtain lower energy on reading it is possible to proceed in two ways. In a first case, which corresponds to the preferred embodiment of the invention, the same laser is used, with the same intensity, on writing and reading but the time of application of the laser beam spot at each point is distinctly less for reading and for writing. In the example mentioned above — where the time of application of the laser beam at each point is one millisecond on writing — said time of application of the laser beam on reading is of the order of one microsecond.

In a second case, instead of causing the time of application of a laser beam of constant intensity to vary, the intensity itself of said laser beam is made to vary. It is possible, for example, to use a laser of very high power for writing, which enables a very short writing time for each point (for example 0.1 microsecond). Such writing at rapid speed is essential when it is necessary to store in a memory a large number of points, for example for the storage of holograms. Reading can then be effected with a laser of substantially less power than that used for writing and in this case this reading can be carried out at a speed which is of the same order of magnitude as that of the writing. Again in the second case it is also possible to use the same laser for writing and reading, the intensity of the beam on reading being attenuated.

Without wishing to be bound to a particular scientific theory of the invention, it is thought that the irreversible switching of the polarization of the domain may be explained in the following manner: when the laser beam spot of sufficient energy is applied to a point of the face of the plate 111 there is produced over the length of the domain which occurs under this point, a temperature gradient which causes, on a microscopic scale, a polarisation gradient. In fact, since the temperature at the end of the illuminated domain is greater than over the rest of the length of said domain, the polarization at this end is less. This polarization gradient creates an electric field, on a macroscopic scale, oriented in the reverse direction of polarization. If the value of this electric field — which will be called "pyroelectric field" — is sufficient, there is obtained an irreversible switching of the polarization of the domain. It is also to be noted that such a pyroelectric field is also created on reading; however this pyroelectric field on reading only produces a reversable switching of polarization. In other words, on reading, after the disappearance of the spot of the laser beam, polarization resumes its initial sense.

To return to the assembly which is shown in FIG. 12, the latter comprises, between the laser 121 and the scanning means 50 and 51, a shutter 52 and control means 52a for this shutter. The control means 52a of the shutter 52 are, of course, synchronized with the scanning and they enable a time of application of the laser beam at each point of the active face of the plate 111 to be obtained, on scanning, which is adjustable.

The ferroelectric memory which has just been described with regard to FIGS. 12 to 15, can lend itself to numerous modifications without departing from the scope of the invention.

Among these modifications it should first be mentioned that the scanning means may be produced in any suitable way. It is possible for example to effect the scanning of the laser beam by means of Kerr effect or Pockels effect prisms (as mentioned in the foregoing description). However as regards the scanning it must also be mentioned that the latter can equally be effected by movement of the plate. In this case, the ferroelectric plate can have the form of a flat disc (not shown) rotatable around its axis, the laser beam being, in this case, moved in a radial direction.

Again as regards the modifications, the invention is in no way limited to the use of triglycine sulfate alone but it can be used with any other ferroelectric material. However the inventors have noted that, apart from triglycine sulfate, lead zircotitanate and triglycine seleniate have advantageous properties to produce a memory according to the invention. All these materials are of the type in which the polarization changes sense without changing direction. The invention can however be applied with ferroelectric materials in which the application of an electric field does not modify the sense of polarization but its direction. By way of example of such a material bismuth titanate ($Bi_4Ti_3O_{12}$) may be mentioned. In this case, reading can then be effected in a substantially different manner, without the intervention of the reading resistance. In fact, in this case, when a plate formed of this material is observed between two crossed polarizers, the domains which have a first direction are transparent whilst those which have a second direction are opaque. Reading such a memory can hence be effected by transparency or by projection.

The advantages of the memory according to the invention are numerous. In particular the suppression of the voltage difference between the metallized faces of the plate on writing is a considerable simplification of the writing assembly. In addition, it is observed that the lateral dimensions of the domains are much reduced in this case. The inventors have also noted that, the greater the voltage applied on writing (and of the same sign as the erasing voltage), the smaller are the lateral dimensions of the domains. In other words, the density of information stored per unit surface by said plate is all the greater as the voltage applied on writing is greater. However, as has been mentioned above, there must then be used a more powerful laser or a greater writing time.

In the course of experiments carried out by the inventors the latter have obtained, with a second voltage of zero value or not, writing on the plate with a series of separate points (domains) distances of $10\mu$. The information density written on a plate 111 can then be very great. The upper limit of this density would only be imposed by the resolution of the optical means for concentrating the beam 127.

It will therefore readily be appreciated that a ferroelectric memory device according to this invention offers numerous advantages, including the following in particular:

ease of manufacture, through the use of only two electrodes;

high storage capacity, by virtue of the high density of writing and reading cells per square centimetre;

extremely easy writing and reading, merely requiring scanning by means of a concentrated laser beam and connection across the two electrodes either of a voltage source or of a resistor associated to means for detecting the flow and direction of the current therethrough;

the possibility of rapidly erasing the whole memory;

the possibility of reading the memory a great number of times without loss of information since it is not a volatile storage;

high-speed reading, at the rate of as much as a few microseconds per bit.

The applications of the ferroelectric memory according to the invention are numerous. There may be mentioned, by way of example, the application to the production of memories for high-speed memory electronic computers or telephone exchanges, of dead memories, of holographic memories and television screens. Also it can be used in other data or information processing units, as well as for displaying information digitally or graphically. It may be used likewise for type-setting.

As is self-evident and as emerges already from the foregoing, the invention is in no way limited to those of its types of application and embodiments which have been more especially envisaged; it encompasses, on the contrary, all modifications and for example those in which, instead of using a laser, other means are employed enabling the local heating of the active face of the plate, these means not introducing however an interfering charge or voltage.

We claim:

1. A ferroelectric memory comprising a thin plate formed of a ferroelectric material, cut perpendicularly to its ferroelectric axis and metallized directly on its two larger faces perpendicular to said axis, means for applying, at will, a preparation or erasing voltage between these two faces in order to polarize all the ferroelectric domains in the same direction, a load resistor connectable across the two metallized faces of the plate, means for concentrating the spot of a laser beam directly on one of the two metallized faces constituting an active face of the plate and to scan said active face point by point with this spot, said laser being used both for writing and reading information on the active face of said memory and means for detecting the flow and direction of a current in said load resistor when it is connected across the two metallized faces, said memory including means for applying, during writing, a voltage of zero value, the energy introduced by the laser beam at each point of the active face of said plate being at least equal to a given value during writing, this energy being adapted to create a polarization gradient for generating an electric field adapted to produce an irreversible switching of the polarization of the domain situated under said point, this energy introduced by the laser beam having a value substantially less on reading.

2. The memory according to claim 1, comprising control means for the time of application, at each point of said active face, of the spot of the laser beam having a given intensity, these control means being arranged to enable adjustment of the time of application so that this time of application is substantially greater on writing than on reading, the time of application of the spot of the laser beam on writing being at least equal to a value $t^+$ which is a function of said given intensity.

3. The memory according to claim 1, comprising attenuation means for attenuating the intensity of the laser beam on reading.

4. The memory according to claim 1, wherein the means for concentrating the spot of the laser beam directly on the active surface of said plate comprise a microscope.

5. The memory according to claim 1, wherein the metal covering said active face of the plate comprises a layer of chromium whose squared resistance is equal to 377 ohms.

6. The ferroelectric memory according to claim 1, wherein said ferroelectric material is selected from the group comprising the following materials: triglycine sulfate, lead zircotitanate and triglycine seleniate.

7. The memory according to claim 1, comprising a resistance of high value with respect to the value of the load resistor, this resistance being connected between the metallized faces of the plate.

8. A ferroelectric memory comprising a thin plate formed of a ferroelectric material and metallized directly on its two large faces, means for applying, at will, an erasing voltage between these two faces in order to polarize all the domains in the same direction, means for concentrating the spot of a laser beam directly on one of the two metallized faces of the plate and to scan said face point by point with this spot, and means for reading information written on said memory, comprising means for applying between said two faces on writing, a voltage of zero value, the energy introduced by the spot of the laser beam at each point of said face of the plate being at least equal to a given value, this energy being adapted to create a polarization gradient for generating an electric field adapted to produce an irreversible switching of the polarization of the domain situated under said point.

9. The memory according to claim 8, wherein said ferroelectric material is bismuth titanate.

10. A ferroelectric memory device which includes, in combination, a thin plate made of a ferroelectric material cut at right angles to its ferroelectric axis and metallized directly on its two larger faces perpendicular thereto, means for applying at will across said two faces a first or a second voltage, a load resistor connectable across the two metallized faces of the plate, means for focusing the spot of a laser beam of desired intensity to reach a focus directly on one of the two metallized faces constituting an active face of the plate and for scanning said active face of the plate with said spot, said laser beam being utilized both for writing and reading information on said memory device, means capable of occluding when desired said laser spot during writing, and means for detecting the flow and direction of a current through said resistor when the same is connected across said two faces, the desired intensity of the laser beam being selected in order to produce, on reading, a reversible switching of the polarization of the domains, and an irreversible switching of the polarization of the domains when said laser spot is unoccluded.

11. A ferroelectric memory device including a thin plate of a ferroelectric material cut at right angles to its ferroelectric axis and metallized directly on its two larger faces perpendicular thereto, means for applying across said two faces a preparation voltage, a load resistor connectable across the two metallized faces of the plate, means for focusing the spot of a laser beam to reach a focus directly on one of the two metallized faces constituting an active face of the plate and for scanning said active face of the plate with said spot, said laser being utilized both for writing and reading information on the memory device, means for occluding said laser spot during writing, means for detecting the flow and direction of a current through said load resistor when it is connected between the two metallized faces and means for applying between said faces, during writing, a voltage of zero value or of the same sense as the preparation voltage, the energy brought by the spot of the laser beam on each point of the active face of the plate having, during writing, a value which is at least equal to a given value, this energy being adapted to create a polarization gradient for generating an electric field adapted to produce an irreversible switching of the polarization of the domain situated under said point, said energy brought by the spot of the laser beam to each point of the active face of the plate having a value, during reading, which is much less than the value of said energy during writing.

12. A ferroelectric memory comprising a thin plate formed of a ferroelectric material, cut perpendicularly to its ferroelectric axis and metallized directly on its two larger faces perpendicular to said axis, means for applying, at will, a preparation or erasing voltage between these two faces in order to polarize all the ferroelectric domains in the same direction, a load resistor connectable across the two metallized faces of the plate, means for concentrating the spot of a laser beam directly on one of the two metallized faces constituting an active face of the plate and to scan said active face point by point with this spot, said laser being used both for writing and reading information on the active face of said memory and means for detecting the flow and direction of a current in said load resistor when it is connected across the two metallized faces, said memory further including means for applying, during writing, a voltage of zero value or of the same sense as the erasing voltage, the energy introduced by the laser beam at each point of the active face of said plate being at least equal to a given value during writing, this energy being adapted to create a polarization gradient for generating an electric field adapted to produce an irreversible switching of the polarization of the domain situated under said point, this energy introduced by the laser beam having a value substantially less on reading; and wherein the energy introduced by the laser beam at each point of the active face of said plate on reading is adapted to generate a polarization gradient for creating an electric field adapted to produce a reversible switching of the polarization of the domain beneath said point.

13. A ferroelectric memory comprising a thin plate formed of a ferroelectric material, cut perpendicularly to its ferroelectric axis and metallized directly on its two larger faces perpendicular to said axis, means for applying, at will, a preparation or erasing voltage between these two faces in order to polarize all the ferroelectric domains in the same direction, a load resistor connectable across the two metallized faces of the plate, means for concentrating the spot of a laser beam directly on one of the two metallized faces constituting an active face of the plate and to scan said active face point by point with this spot, said laser being used both for writing and reading information on the active face of said memory and means for detecting the flow and direction of a current in said load resistor when it is connected across the two metallized faces, said memory including means for applying, during writing, a voltage of the same sense as the erasing voltage, the energy introduced by the laser beam at each point of the active face of said plate being at least equal to a given value during writing, this energy being adapted to create a polarization gradient for generating an electric field adapted to produce an irreversible switching of the polarization of the domain situated under said point, this energy introduced by the laser beam having a value substantially less on reading.

14. A ferroelectric memory comprising a thin plate formed of a ferroelectric material and metallized directly on its two large faces, means for applying, at will, an erasing voltage between these two faces in order to polarize all the domains in the same direction, means for concentrating the spot of a laser beam directly on one of the two metallized faces of the plate and to scan said face point by point with this spot, and means for reading information written on said memory, comprising means for applying between said two faces on writing, a voltage of the same sense as the erasing voltage, the energy introduced by the spot of the laser beam at each point of said face of the plate being at least equal to a given value, this energy being adapted to create a polarization gradient for generating an electric field adapted to produce an irreversible switching of the polarization of the domain situated under said point.

* * * * *